(12) United States Patent
Kim (10) Patent No.: US 6,172,477 B1
(45) Date of Patent: Jan. 9, 2001

(54) APPARATUS FOR CHARGING A BATTERY OF A PORTABLE TERMINAL

(75) Inventor: Ji-Hwa Kim, Kumi-shi (KR)

(73) Assignee: Samsung Electronics Co., Ltd. (KR)

( * ) Notice: Under 35 U.S.C. 154(b), the term of this patent shall be extended for 0 days.

(21) Appl. No.: 09/057,832

(22) Filed: Apr. 9, 1998

(30) Foreign Application Priority Data

Apr. 9, 1997 (KR) .................................................. 97/13067

(51) Int. Cl.$^7$ .................................................. H01M 10/46
(52) U.S. Cl. .................................................. 320/114
(58) Field of Search .................................. 320/111, 113, 320/114, 115, 128

(56) References Cited

U.S. PATENT DOCUMENTS

| | | | |
|---|---|---|---|
| 3,601,679 | * 8/1971 | Braun et al. | 320/114 |
| 3,970,912 | * 7/1976 | Hoffman | 320/114 |
| 5,075,615 | * 12/1991 | Dantis | 320/115 X |
| 5,268,629 | * 12/1993 | Franke | 320/114 |
| 5,446,364 | * 8/1995 | Naskali | 320/114 |
| 5,736,830 | * 4/1998 | Weng | 320/115 X |

* cited by examiner

*Primary Examiner*—Edward H. Tso
(74) *Attorney, Agent, or Firm*—Dilworth & Barrese (57) ABSTRACT

Apparatus for charging a portable terminal in a radio-telephone system which allows a telephone conversation to be conducted while the portable terminal is being charged. In one embodiment, the charging apparatus includes an alternating current (AC) adapter for converting an AC power source voltage into a predetermined AC voltage, a rectifying circuit disposed within the portable terminal for rectifying the AC voltage provided from the AC adapter and converting the AC voltage into a direct current (DC) voltage, a charging circuit disposed within the portable terminal for receiving the DC voltage output from the rectifying circuit and charging a battery of the portable terminal with the DC voltage, and a charging current control circuit for controlling the amount of charging current applied to the battery.

11 Claims, 6 Drawing Sheets

APPARATUS FOR CHARGING A BATTERY OF A PORTABLE TERMINAL

BACKGROUND OF THE INVENTION

1. Field of the Invention

The present invention relates to charging equipment for use in a radiotelephone system and, in particular, to equipment for charging a portable terminal in a radio-telephone system.

2. Description of the Related Art

In general, a radio-telephone system includes a fixed terminal and a portable terminal. The fixed terminal is wire-connected to a public switched telephone network. The portable terminal is radio-connected to the fixed terminal, The portable terminal is powered by a rechargeable battery which is mounted within the portable terminal so as to enable various functions of the portable terminal such as telephone speech.

Figure 1:
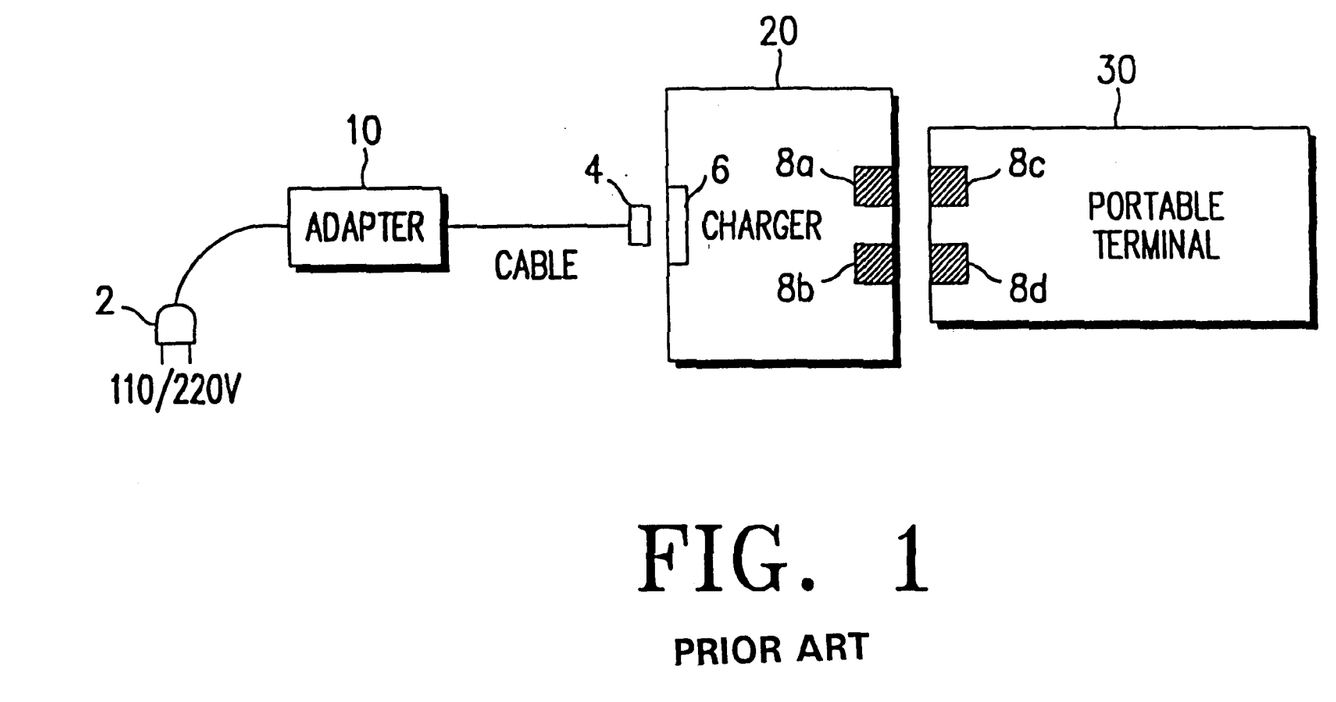
FIG. 1 is a block diagram of conventional equipment for charging a portable terminal.

Referring to FIG. 1, a block diagram of conventional equipment for charging a battery which is mounted within a portable terminal 30 of a radio-telephone system is shown. As illustrated, the conventional charging equipment includes an adapter 10 and a charger 20. In order to charge a portable terminal 30 (i.e., charge a battery in the portable terminal 30), the adapter 10 and the charger 20 are connected to each other via a plug 4 and a jack 6 (i.e, the power connector elements). The charger 20, in turn, is connected to the portable terminal 30 via charging terminals 8a, 8b, 8c and 8d.

There are several disadvantages associated with the conventional charging equipment described above. First, the portable terminal 30 can only be charged by using the adapter 10 and the charger 20. Specifically, in order to charge the portable terminal 30, a user is required to connect the adapter 10 and the charger 20 to each other, which results in user inconvenience. Another disadvantage is that the user cannot utilize the portable terminal 30 (i.e., maintain a telephone conversation) while it is being charged since the portable terminal 30 must be connected to the charger 20 via the charging terminals 8a, 8b, 8c and 8d in order to be charged. Due to its connection to portable terminal 30 during the charging process, charger 20 physically prevents the placing or receiving a telephone call. In addition, the adapter 10 which is used for charging the portable terminal 30 is a direct current (DC) adapter (for converting alternating current (AC) voltage to DC voltage) which is very expensive and, therefore, uneconomical.

SUMMARY OF THE INVENTION

It is an object of the present invention to provide equipment for charging a portable terminal in a radio-telephone system, which eliminates and/or mitigates user inconvenience in charging the portable terminal.

It is another object of the present invention to provide charging equipment which allows a telephone conversation to be conducted on the portable terminal while the portable terminal is being charged.

It is yet another object of the present invention to provide economical equipment for charging a portable terminal in a radio-telephone system.

To achieve these and other objects, equipment for charging a portable terminal in a radio-telephone system according to the present invention includes an alternating current (AC) adapter which is inexpensive and provides charging voltage in both AC and DC directions (i.e., provides an electric power supply through an AC/AC (Alternating current) or AC/DC (Direct current) adapter), and various circuits disposed within the portable terminal, which are operatively connected to the AC adapter, to replace the conventional charger.

In one aspect of the present invention, equipment for charging a battery of a portable terminal in a radio-telephone system comprises a direct current (DC) adapter for converting an alternating current (AC) voltage (e.g., a common usage level of 110/220 V) to a predetermined DC voltage and outputting the DC voltage; a charging circuit disposed within the portable terminal for receiving the DC voltage from the adapter and charging the battery of the portable terminal with the DC voltage; and a charging current control circuit disposed within the portable terminal, which is operatively connected to the charging circuit, for controlling the amount of charging current applied to the battery during the charging of the battery.

In another aspect of the present invention, equipment for charging a battery of a portable terminal in a radio-telephone system includes an alternating current (AC) adapter for converting an AC power source voltage (e.g., a common usage level of 110/220 V) to a predetermined AC voltage; a rectifying circuit disposed within the portable terminal for rectifying the AC voltage provided from the AC adapter and converting the AC voltage into a direct current (DC) voltage; a charging circuit disposed within the portable terminal, operatively connected to the rectifying circuit, for charging the battery of the portable terminal with the DC voltage output from the rectifying circuit; and a charging current control circuit disposed within the portable terminal, operatively connected to the charging circuit, for controlling the amount of charging current provided to the battery.

These and other objects, features and advantages of the present invention will become apparent from the following detailed description of illustrative embodiments, which is to be read in connection with the accompanying drawings.

DETAILED DESCRIPTION OF PREFERRED EMBODIMENTS

In the following description of preferred embodiments, it is to be understood that same or similar elements illustrated in the Figures are designated with the same reference numeral. It is to be further understood that well-known functions and constructions will not be described with any unnecessary detail. Moreover, the terms designated below for the various elements of the present invention are defined in accordance with their functions and may be changed depending on the intention or convention of the user or chip designer. Thus, the terms herein are defined in accordance with the description of the overall specification.

Figure 2:
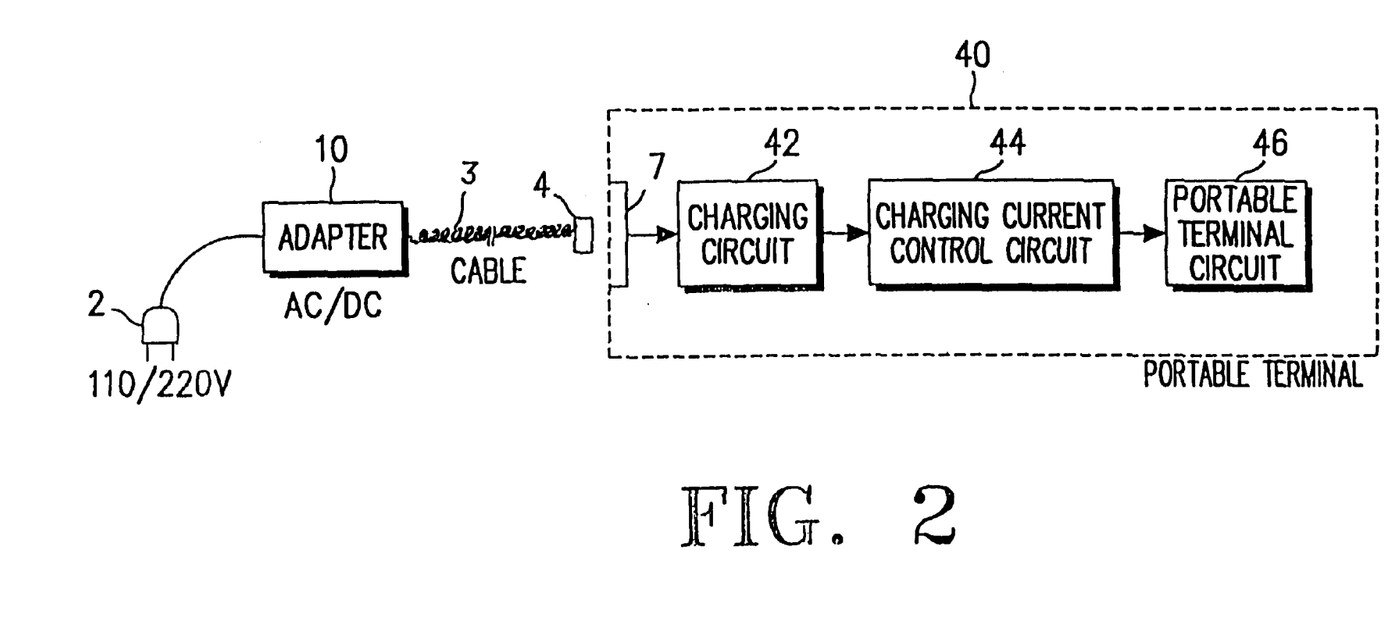
FIG. 2 is a block diagram of equipment for charging a portable terminal according to one embodiment of the present invention.
Figure 5:
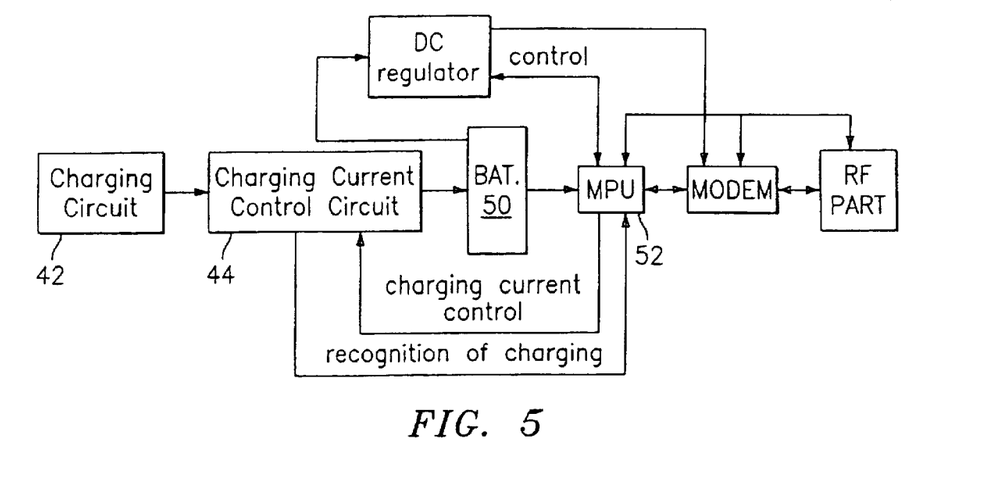
FIG. 5 is a block diagram of the portable terminal circuit according to an embodiment of the present invention.

Referring now to FIG. 2, a block diagram of equipment for charging a portable terminal in a radio-telephone system according to an embodiment of the present invention is shown. The charging equipment includes an adapter 10 and, located within a portable terminal 40, a charging circuit 42, a charging current control circuit 44 and a portable terminal circuit 46. FIG. 5 shows a block diagram of an exemplary circuit for the portable terminal as connected with charging current control circuit 44 and charging circuit 42. The charging current control circuit 44 is in communication with master processing unit (MPU) 52 which provides control signals to circuit 44. Battery 50 contained within the portable terminal 46 is connected to control circuit 44 to receive the charging current, and is also connected to a DC regulator which provides electrical supply power to the modem, and also provides MPU 52 with a reference voltage. MPU 52 compares the reference voltage provided by the DC regulator with the voltage of the battery (BAT) and generates the charging current control signal which controls charging current control circuit 44. The modem and RF part are generally found in portable terminals, and are used for establishing wireless connections via the protocol being used (e.g., TDMA, FDMA, CDMA, etc.). The RF part performs modulation of outgoing transmissions, and demodulates received transmissions. The circuits within the portable terminal 40 replace the charger 20 which is separately provided in the conventional charging equipment shown in FIG. 1.

Figure 6:
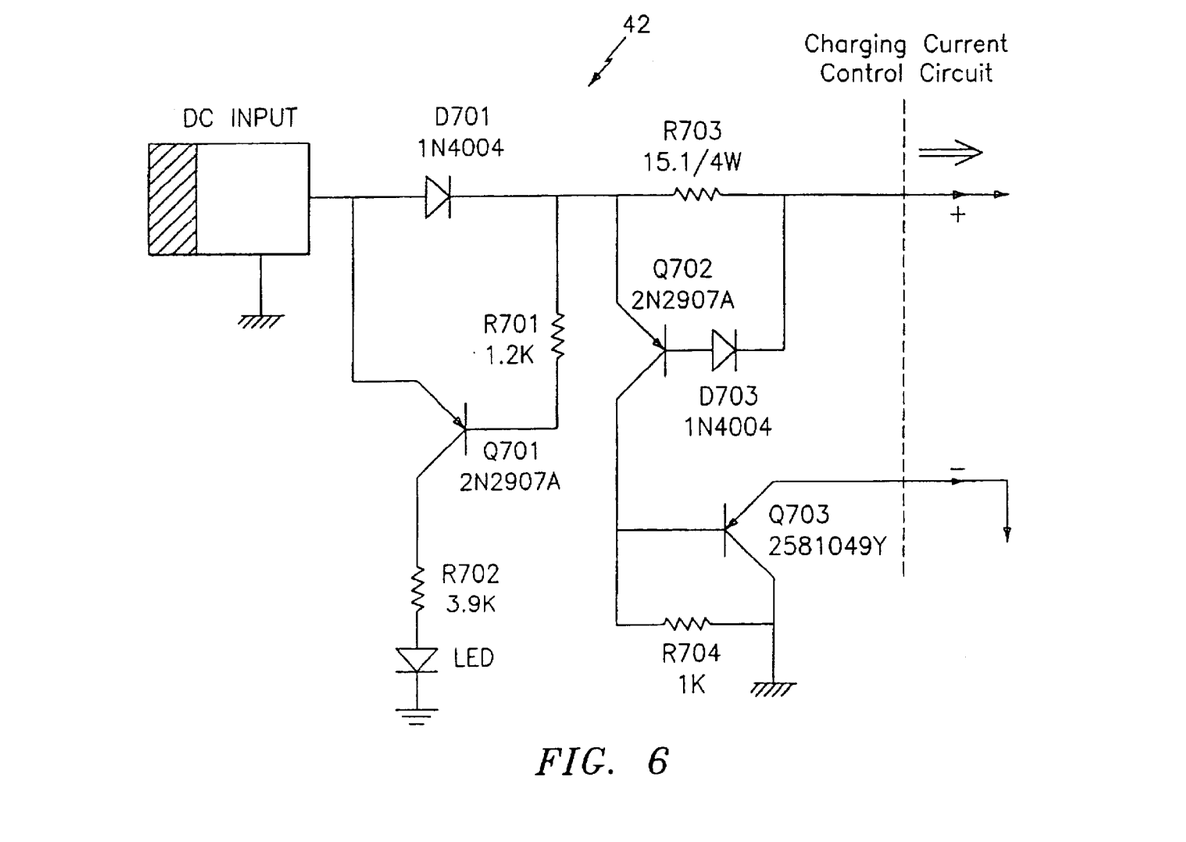
FIG. 6 is a schematic diagram of an exemplary embodiment of a charging circuit according to the invention.

The charging equipment further includes a power source plug 4 and a power source jack 7 which are connected to each other to provide power from the adapter 10 to the portable terminal during a charging process. In particular, the power source plug 4 is mounted at one end of a power source cable 3 and the power source jack 7 is mounted at an input of the portable terminal 40. The adapter 10 converts AC voltage of 110/220 V, which is provided through a power source plug 2, into a predetermined DC voltage for charging. The DC voltage is output from the adapter 10 and provided to the portable terminal 40 through the power source cable 3. The charging circuit 42 provides the DC voltage to a battery (not shown) in the portable terminal circuit 46 so as to charge the battery of the portable terminal 40. FIG. 6 shows a schematic diagram of the charging circuit 42 according to an exemplary embodiment of the present invention. Charging circuit 42 receives a DC input voltage either from the adapter 10 or rectifying circuit 48 (FIG. 3) and generates an output charging current suitable for application to the battery of the portable terminal. When the current generated through the base of transistor Q702 meets the threshold value of diode D703, said diode conducts the current to provide the positive DC charging current. The emitter of transistor Q703 is used to provide the negative DC charging current (i.e., ground). The values of the electrical components of charging circuit 42 can be varied according to the desired application without departing from the scope of this disclosure. Charging circuit 42 can be any suitable known type of circuit for providing a charging current to a battery.

Figure 7:
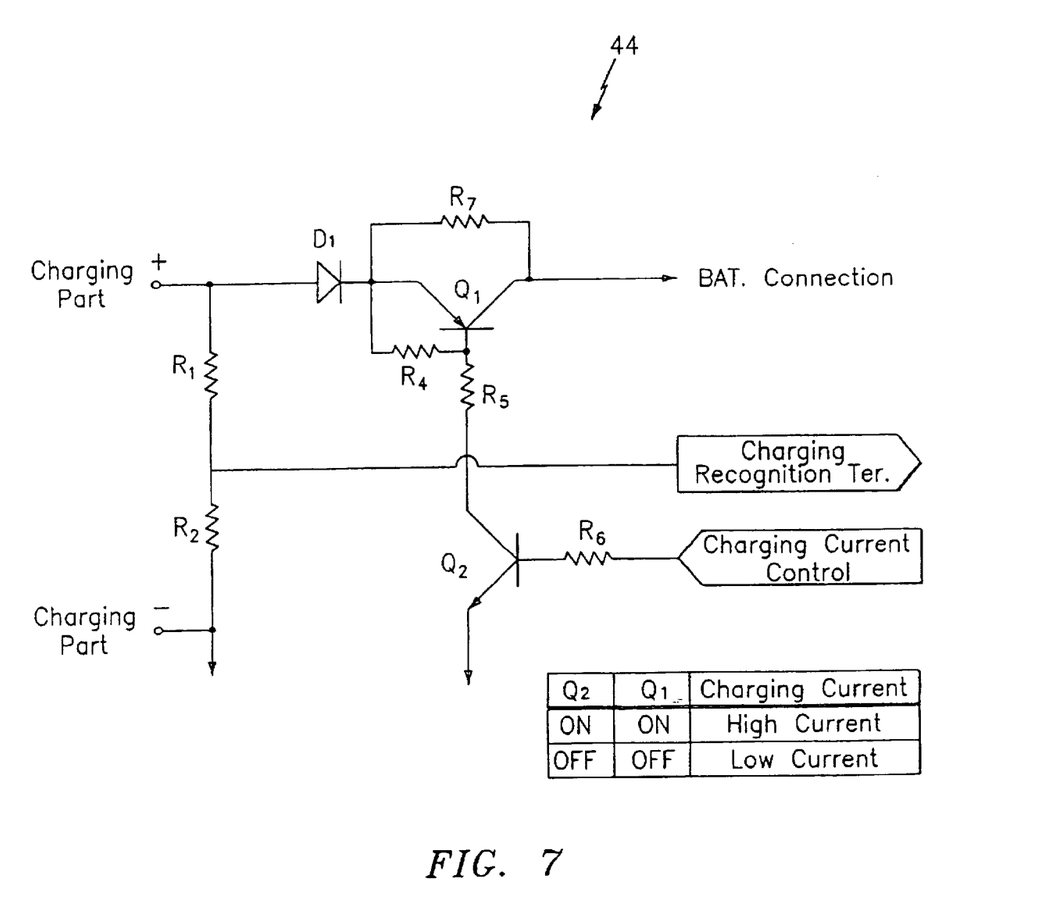
FIG. 7 is a schematic diagram of an exemplary embodiment of a charging current control circuit according to the invention.

The charging current control circuit 44, operatively connected between the charging circuit 42 and the portable terminal circuit 46, controls the amount of charging current which is provided to the battery. Specifically, since the amount of current consumed in the portable terminal 40 varies depending on whether the portable terminal 40 is being used or is in a telephone standby state (i.e., only being charged), the charging current control circuit 44 allows charging current to flow such that sufficient current is provided during use of the telephone but the amount of charging current provided to the battery is controlled so as to not overcharge the battery. FIG. 7 shows a schematic diagram of an exemplary embodiment of the charging control circuit 44 according to the invention. Charging control circuit 44 has positive and negative input terminals from charging circuit 42, and is also in two way communication with the MPU 52 of the portable terminal. The two way communication with MPU 50 enables the MPU to monitor the charging of the battery, while providing control circuit 44 with control information as to the status of charging battery. As explained earlier, charging current control circuit 44 has an output connected to the battery 50 contained within the portable terminal. As shown, when both transistors Q1 and Q2 are conducting (i.e., on) the charging current is high, and when both transistors are not conducting (i.e., off), the charging current is low.

As demonstrated above, by eliminating the need for a separate charger (such as the one shown in FIG. 1), the present invention provides several advantages over the prior art. For instance, the user is not inconvenienced by having to connect an adapter 10 to the charger 20 and then connect the charger to the portable terminal 30 (as shown in FIG. 1). Further, since a separate charger is not required, the length of the power source cable 3 connecting the adapter 10 to the charging circuit 42 can be extended. Consequently, the portable terminal 40 may easily be charged although the portable terminal 40 may be remotely disposed from the adapter 10. Moreover, a telephone conversation may be conducted while the portable terminal 40 is being charged. By extending the length of cable 3 to maintain the electrical connection of the adapter 10 with portable terminal 30, and the incorporation of charging circuit 42 within portable terminal 30, a user can conduct a telephone conversation during the charging without removing plug 4. The conventional charger 20 physically prevented telephone communication during the charging process, because when portable terminal 30 is disconnected from charger 20 to enable a user to conduct a telephone conversation, the voltage of the portable terminal 30 immediately drops to a level that prevents the user from maintaining the telephone conversation. By connection to adapter 10, via cable 3, the necessary voltage level for conducting a telephone call can be provided by the adapter. Preferably, the power source cable 3 is formed in the shape of a continuous winding curl (i.e., spring-shaped) so as to facilitate movement of the portable terminal 40 while it is connected to the adapter 10.

Figure 3:
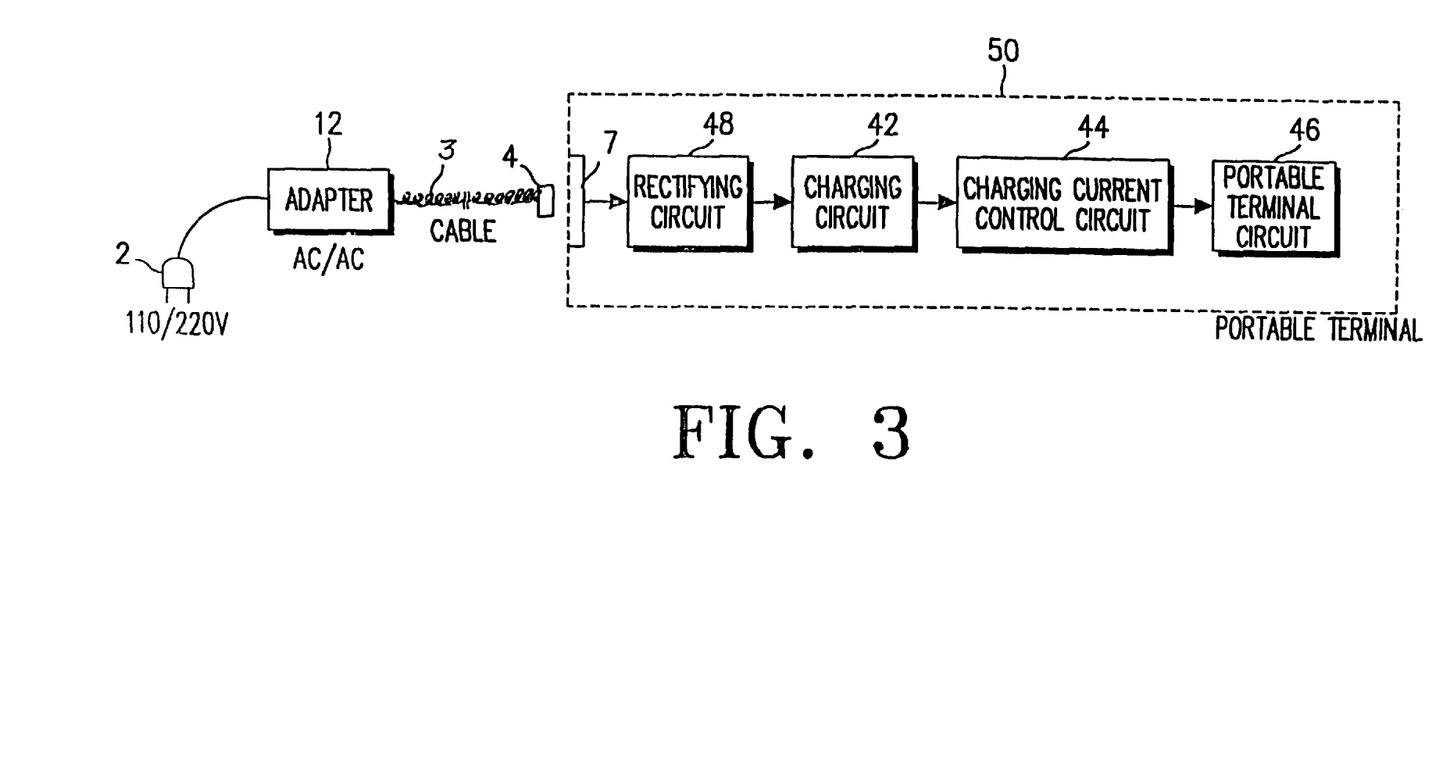
FIG. 3 is a block diagram of equipment for charging a portable terminal according to another embodiment of the present invention.

Referring now to FIG. 3, a block diagram of equipment for charging a portable terminal in a radio-telephone system in accordance with another embodiment of the present invention is shown. The charging equipment includes a charging circuit 42, a charging current control circuit 44 and a portable terminal circuit 46 disposed within a portable terminal 50 (similar to those circuit elements shown in FIG. 2), in addition to a rectifying circuit 48. In this embodiment, the charging equipment also includes an inexpensive AC adapter 12 which is used for converting the AC voltage of 110/220 V to an AC voltage required for charging. Specifically, the adapter 12 converts the AC voltage of 110/220 V provided through the power source plug 2 to an AC voltage needed for charging and outputs the converted AC voltage to the rectifying circuit 48 (in the portable terminal 50) through a power source cable 3, a power source plug 4 and a power source jack 7, sequentially. The rectifying circuit 48 converts the AC voltage output from the adapter 12 into the DC voltage required for charging. The DC voltage is then output to the charging circuit 42. The charging circuit 42 provides the DC voltage to the battery (not shown) in the portable terminal circuit 46 and charges the battery. The charging current control circuit 44, operatively connected between the charging circuit 42 and the portable terminal circuit 46, controls the amount of charging current provided to the battery during the charging process.

The charging equipment in the embodiment illustrated in FIG. 3 has various advantages. First, it eliminates the need for an expensive DC adapter. In addition, the charging equipment provides AC voltage to the portable terminal 50 and thus affords the ability to charge the portable terminal 50 in both the AC and DC directions. (i.e., an AC/AC or AC/DC adapter can be used because the rectifying circuit is included within portable terminal 50) Moreover, the advantages set forth above for the previous embodiment of FIG. 2 also apply to the embodiment of FIG. 3.

Figure 4:
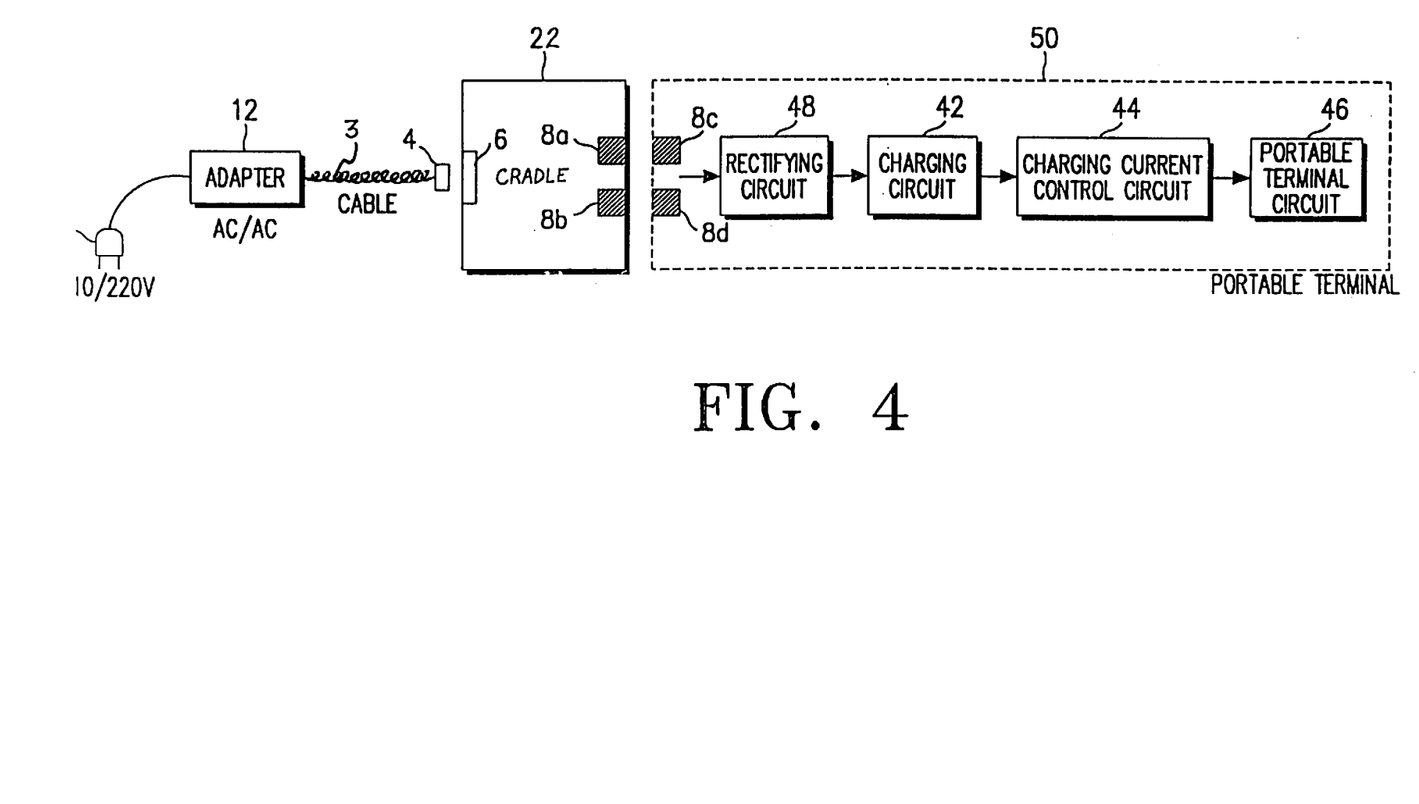
FIG. 4 is a block diagram of equipment for charging a portable terminal according to a further embodiment of the present invention.

Referring now to FIG. 4, a The charging equipment according to this embodiment includes an adapter 12, a rectifying circuit 48, a charging circuit 42, a charging current control circuit 44 and a portable terminal circuit 46, all disposed within the portable terminal 50 (similar to the embodiment of FIG. 3), in addition to a cradle 22 having a power source jack 6 for inputting AC voltage from the adapter 12, and charging terminals 8a and 8b for outputting AC voltage to the portable terminal 50. Specifically, the AC voltage which is output from the adapter 12 is provided to the power source jack 6 of the cradle 22 through the power source cable 3 and the power source plug 4. The AC voltage is then provided to the charging terminals 8c and 8d of the portable terminal 50 through the charging terminals 8a and 8b which are mounted at an output end of the cradle 22.

The charging equipment of FIG. 4 is similar to the charging equipment of FIG. 3., except for cradle 22 which is used for inputting the AC voltage (which is output from the adapter 12) into the portable terminal 50. It should be understood that, unlike the conventional charger 20 (FIG. 1), the cradle 22 shown in FIG. 4 is not used for the charging operation (i.e., directly charging the battery), but, as stated above, is used instead to input the AC voltage from the adapter 12 into the portable terminal 50. Consequently, the charging equipment in the embodiment of FIG. 4 has the same advantages as stated above for the embodiment of FIG. 3.

In summary, the charging equipment of the present invention includes a plurality of circuits disposed within the portable terminal which are used for charging the portable terminal. In addition, an AC adapter is utilized (in 2 of the 3 embodiments of the present invention described herein) instead of the more expensive DC adapter. As such, the charging equipment of the present invention has various advantages over the conventional charging example, as stated above, a telephone communication can be conducted while the portable terminal is being charged. Further, since a separate charger is not required, the user is not inconvenienced while charging the portable terminal. In addition, the AC adapter enables the portable terminal to be charged in both the DC and AC directions, thereby providing economical charging equipment.

Although illustrative embodiments of the present invention have been described herein with reference to the accompanying drawings, it is to be understood that the present invention is not limited to those precise embodiments, and that various other changes and modifications may be affected therein by one of ordinary skill in the art without departing from the scope or spirit of the invention. All such changes and modifications are intended to be included within the scope of the invention as defined by the appended claims.

What is claimed is:

1. An apparatus for charging a battery of a portable terminal in a radio-telephone system comprising:

a direct current (DC) adapter for converting an alternating current (AC) voltage to a predetermined DC voltage and outputting said DC voltage;

a charging circuit disposed within said portable terminal for receiving said DC voltage from said adapter and charging said battery of said portable terminal with said DC voltage;

a charging current control circuit disposed within said portable terminal, which is operatively connected to said charging circuit, for controlling the amount of charging current provided to said battery; and a controller in operative communication with the charging current control circuit for monitoring the charging status of the battery and for providing control information regarding the status of the charging battery.

2. The charging apparatus according to claim 1, further comprising:

a power source cable of a predetermined length having a first and second end, said first end of said power source cable being connected to an output of said DC adapter;

a power source plug mounted to said second end of said power source cable; and a power source jack mounted at an input end of said charging circuit, wherein said DC voltage output from said DC adapter is provided to said charging circuit by connecting said power source plug of said power source cable to said power source jack of said charging circuit.

3. The charging apparatus according to claim 2, wherein said length of said power source cable is variable.

4. The charging apparatus according to claim 3, wherein said power source cable is spring-shaped.

5. An apparatus for charging a battery of a portable terminal in a radio-telephone system comprising:

an alternating current (AC) adapter for converting an AC power source to a predetermined AC voltage and outputting said AC voltage;

a rectifying circuit disposed within said portable terminal for rectifying said AC voltage output from said AC adapter and converting said AC voltage into a direct current (DC) voltage;

a charging circuit disposed within said portable terminal and operatively connected to said rectifying circuit, for charging said battery of said portable terminal with said DC voltage output from said rectifying circuit;

a charging current control circuit disposed within said portable terminal, operatively connected to said charging circuit, for controlling the amount of charging current provided to said battery; and a controller in operative communication with the charging current control circuit for monitoring the charging status of the battery and for providing control information regarding the status of the charging battery.

6. The charging apparatus according to claim 5, further comprising:

a power source cable of a predetermined length having a first end and a second end, said first end of said power source cable being connected to an output of said AC adapter;

a power source plug mounted to said second end of said power source cable; and a power source jack mounted at an input end of said rectifying circuit, wherein said AC voltage output from said adapter is provided to said rectifying circuit by connecting said power source plug of said power source cable to said power source jack of said rectifying circuit.

7. The charging apparatus according to claim 6, wherein said length of said power source cable is variable.

8. The charging apparatus according to claim 7, wherein the power source cable is spring-shaped.

9. The charging apparatus according to claim 5, further comprising:

a first set of charging terminals located on said portable terminal, said first set of charging terminals being electrically connected to said rectifying circuit; and a charger having a predetermined power source jack at an input end of said charger and a second set of charging terminals on an output end of said charger, said first set of charging terminals on said portable terminal corresponding to said second set of charging terminals of said charger.

10. The charging apparatus according to claim 9, further comprising:

a power source cable of a predetermined length having a first end and a second end, said first end of said power source cable being connected to an output of said AC adapter; and a power source plug mounted to said second end of said power source cable; wherein said AC voltage output from said adapter is provided to said rectifying circuit of said portable terminal by connecting said power source plug of said power source cable to said power source jack at said input end of said charger, and connecting said second set of charging terminals of said charger to said first set of charging terminals of said portable terminal.

11. The charging apparatus according to claim 10, wherein the power source cable is spring-shaped.

* * * * *